J. W. WHITE.
Guards for Doors and Windows.
No. 145,772.            Patented Dec. 23, 1873.
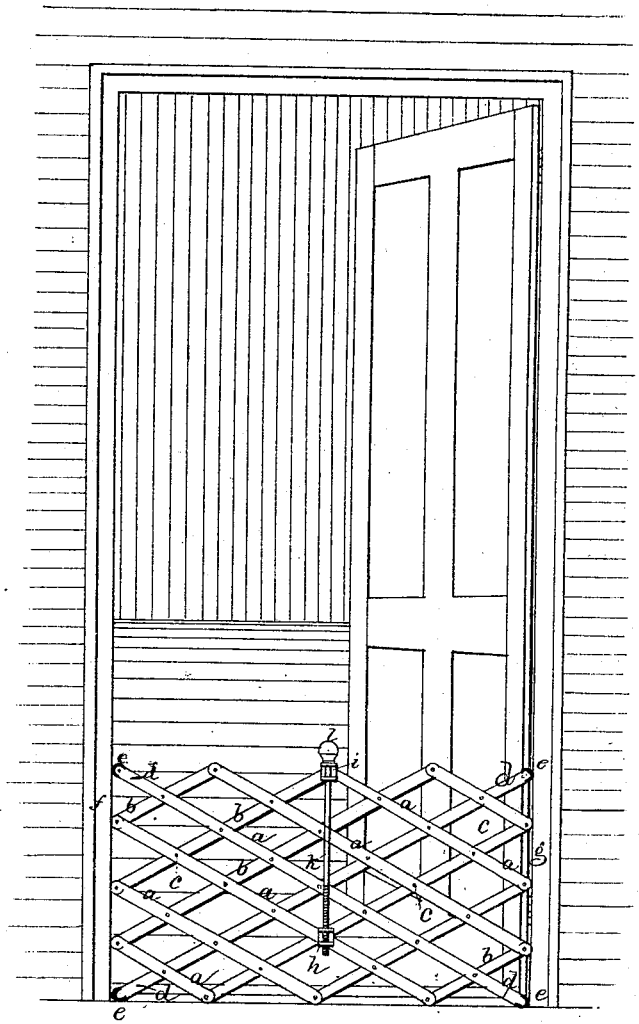

UNITED STATES PATENT OFFICE.

JOSEPH W. WHITE, OF WEYMOUTH, MASSACHUSETTS.

IMPROVEMENT IN GUARDS FOR DOORS AND WINDOWS.

Specification forming part of Letters Patent No. 145,772, dated December 23, 1873; application filed November 28, 1873.

*To all whom it may concern:*

Be it known that I, JOSEPH W. WHITE, of Weymouth, in the county of Norfolk and State of Massachusetts, have invented an Improved Door-Guard; and I do hereby declare that the following, taken in connection with the drawings which accompany and form part of this specification, is a description of my invention sufficient to enable those skilled in the art to practice it.

The invention has reference to the construction of an open-work frame for application to a door, to serve as a guard to keep children from passing through the doorway.

Guards have been made of expansible lattice-work, the expanded lattice being kept expanded by a slotted bar and thumb-screw.

In my invention, I form the guard of a series of cross-bars, jointed together and crossing, so that they can be opened from or closed toward each other, by which movements the guard is contracted or expanded as to length. Placed in a doorway, the frame is expanded, by suitable screw-nuts and collars, until it impinges against the door-jambs with sufficient force to hold it, the expanding mechanism locking the bars of the frame in position.

My invention consists in a door-guard made as thus generally described.

The drawing represents the guards applied to a door.

$a$ denotes one series of bars, running in one direction; $b$, the series running in the opposite direction, or crossing the bars $a$, they being jointed together at all the crossings by pins $c$. The ends of all the bars are jointed, except the ends of the longer or center bars, and the latter ends, $d$, which form the corners of the frame, are preferably shod or cushioned with india-rubber, or other soft material, $e$. To place the door-guard in position between the posts or jambs $f\,g$ of the door-frame, and hold it there, a nut, $h$, is fastened to the lowest bar, $a$ or $b$, that extends across the center of the frame, and a collar or guide, $i$, to the top bar, $a$ or $b$, at the center of the frame; and through the guides or collars $i$ and the nut $h$ extends a rod or pin, $k$, the lower part of which is screw-threaded and works in the screw-thread of the nut, while the upper part slides freely in the collars $i$. Fixed to the top of the pin is a knob, $l$. The upper collar being against the knob, the bars are expanded or opened, and the guard thereby contracted in length, by turning the knob in one direction, while, by turning it in the opposite direction, the bars are contracted or drawn toward each other, thereby lengthening the frame. By means of the screw-pin, the frame is shortened until it will readily enter between the jambs or posts $f\,g$, and, being placed between them, the screw is turned to expand the frame in length until it is cramped tightly between the posts. By making the ends to project slightly beyond the ends of the bars between them, there will be no bearing except that of the ends $d$ of the center bars; and by shoeing them, as described, the woodwork against which they will be expanded will be kept from injury.

I claim—

The lattice guard for doors, made, as described, of the crossing and jointed bars $a\,b$, and arranged to be expanded and held to the door-frame by means of the screw-threaded rod $k\,l$, collar $i$, and nut $h$, as shown and described.

J. W. WHITE.

Witnesses:
 GEO. F. DOTY,
 AMOS S. WHITE.